(12) United States Patent
Saito et al.

(10) Patent No.: US 6,735,941 B2
(45) Date of Patent: May 18, 2004

(54) EXHAUST GAS PURIFICATION SYSTEM HAVING PARTICULATE FILTER

(75) Inventors: Makoto Saito, Okazaki (JP); Shigeto Yahata, Kariya (JP); Masumi Kinugawa, Okazaki (JP); Kiyonori Sekiguchi, Okazaki (JP); Tsukasa Kuboshima, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/420,867

(22) Filed: Apr. 23, 2003

(65) Prior Publication Data

US 2003/0200746 A1 Oct. 30, 2003

(30) Foreign Application Priority Data

Apr. 25, 2002 (JP) ........................................ 2002-123867

(51) Int. Cl.[7] ................................................ F01N 3/00
(52) U.S. Cl. ............................ 60/295; 60/291; 60/297; 60/311
(58) Field of Search .......................... 60/284, 285, 295, 60/297, 311, 291

(56) References Cited

U.S. PATENT DOCUMENTS 6,304,815 B1 * 10/2001 Moraal et al. ............... 701/115
6,510,686 B2 * 1/2003 Kimura et al. ................. 60/296
6,598,387 B2 * 7/2003 Carberry et al. ............... 60/297
6,615,580 B1 * 9/2003 Khair et al. .................... 60/286
6,666,020 B2 * 12/2003 Tonetti et al. .................. 60/286

FOREIGN PATENT DOCUMENTS

| JP | 60-128326 | 7/1985 |
| JP | 7-310524 | 11/1995 |

* cited by examiner

*Primary Examiner*—Thomas E. Denion
(74) *Attorney, Agent, or Firm*—Nixon & Vanderhye P.C.

(57) ABSTRACT

An engine control unit of an exhaust gas purification system of an internal combustion engine measures a pressure difference between an upstream and a downstream of a diesel particulate filter (DPF) after heating the DPF at least to a predetermined temperature and maintaining the DPF at the temperature for a while. The DPF is disposed in an exhaust pipe of the engine. A soluble organic fraction included in particulate matters in exhaust gas can be eliminated at the predetermined temperature. The ECU calculates a quantity of the particulate matters trapped by the DPF from the measured pressure difference. Thus, the quantity of the trapped particulate matters is calculated precisely, independently of a composition of the particulate matters or a state of the soluble organic fraction.

5 Claims, 6 Drawing Sheets

EXHAUST GAS PURIFICATION SYSTEM HAVING PARTICULATE FILTER

CROSS REFERENCE TO RELATED APPLICATION

This application is based on and incorporates herein by reference Japanese Patent Application No. 2002-123867 filed on Apr. 25, 2002.

BACKGROUND OF THE INVENTION

1. Field of the Invention

The present invention relates to an exhaust gas purification system that has a particulate filter for trapping particulate matters included in exhaust gas discharged from an internal combustion engine. Specifically, the present invention relates to an exhaust gas purification system capable of precisely measuring a quantity of the trapped particulate matters.

2. Description of Related Art

Various devices for reducing particulate matters discharged from diesel engines are proposed as measures for protecting the environment. A typical example of such devices is a diesel particulate filter (DPF) disposed in an exhaust pipe. The DPF adsorbs and traps the particulate matters included in exhaust gas when the exhaust gas passes through porous filter walls of the DPF. The surface of the filer wall may be coated with an exhaust gas purification catalyst or an oxidization catalyst. If a quantity of the trapped particulate matters increases, pressure loss in the DPF increases and deficiency such as lowering of engine output may occur. Therefore, the DPF is regenerated regularly by burning and eliminating the trapped particulate matters. Thus, the DPF can be used continuously.

As shown in Japanese Patent Unexamined Publication No. H7-310524, a time interval of the regeneration of the DPF is determined based on whether the quantity of the trapped particulate matters (PM trapped quantity) is greater than a predetermined value or not. The PM trapped quantity is calculated from a pressure difference between the upstream of the DPF and the downstream of the DPF. The DPF is regenerated by heating the DPF up to the temperature at which the particulate matters can be burned. The DPF is heated by heating means such as a burner or a heater, or by high-temperature exhaust gas generated by decreasing an intake air quantity or performing post injection. In order to burn the particulate matters stably, it is important to suitably set the time interval of the regeneration by precisely measuring the PM trapped quantity.

The particulate matters mainly consist of a soluble organic fraction (SOF) and a soot fraction. The SOF fraction includes oil, unburned fuel and the like. Specifically, the SOF has a significant effect on the pressure difference between the upstream and the downstream of the DPF because the SOF exists in various states such as a gaseous state or a liquid state, depending on a state of combustion in a cylinder. It is because the SOF adheres to the soot particulates in various states depending on the state of the SOF, and a clogging degree of the pores of the DPF varies in accordance with the variation in the adhering state of the SOF. In addition, a ratio between the SOF and the soot fraction varies, depending on operating state of the engine. Therefore, the PM trapped quantity varies even when the pressure difference between the upstream and the downstream of the DPF is the same. Thus, it is difficult to calculate the precise PM trapped quantity only from the pressure difference between the upstream and the downstream of the DPF.

A device disclosed in Japanese Patent Unexamined Publication No. H7-310524 has operating state detecting means and correcting means for correcting the PM trapped quantity based on the ratio between the SOF and the soot fraction, in order to solve the deficiency caused by the variation in the composition of the particulate matters. The ratio between the SOF and the soot fraction is estimated from the operating state of the engine. However, even in this scheme, the effect of the variation in the state of the SOF cannot be eliminated fully. If the PM trapped quantity is calculated to be smaller than an actual quantity, excessive particulate matters may be trapped and excessive heat may be generated by a rapid burning of the particulate matters when the DPF is regenerated. A graph in FIG. 4 shows a relation between the PM trapped quantity M and the maximum temperature TMAX in the DPF in a case in which the rapid burning of the particulate matters occurs. As shown in FIG. 4, the maximum temperature TMAX in the DPF increases from normal temperature $T_0$ as the PM trapped quantity M increases. Moreover, an increasing degree of the maximum temperature also increases as the PM trapped quantity M increases. Accordingly, a possibility of damage to the DPF caused by excessive heat generation may increase as the PM trapped quantity M increases. On the other hand, if the PM trapped quantity is calculated to be larger than the actual quantity, frequency of the regeneration of the DPF may increase. As a result, fuel consumption of the engine may increase, or a quantity of the fuel provided to the burner or power consumption by the heater may increase. Therefore, stable regeneration of the DPF at suitable timing, which is achieved by a precise measurement of the quantity of the trapped particulate matters, is required.

SUMMARY OF THE INVENTION

It is therefore an object of the present invention to precisely measure a quantity of trapped particulate matters independently of operating states of an engine and to perform regeneration of a diesel particulate filter at suitable timing. Thus, the regeneration of the diesel particulate filter is performed safely and surely.

According to an aspect of the present invention, an exhaust gas purification system of an internal combustion engine has a particulate filter and regeneration controlling means. The particulate filter is disposed in an exhaust pipe of the engine and traps particulate matters included in exhaust gas. The regeneration controlling means measures a quantity of the trapped particulate matters and performs regeneration of the particulate filter based on the measured quantity of the trapped particulate matters. The regeneration controlling means heats the particulate filter at least to a predetermined temperature at which a soluble organic fraction (SOF) included in the particulate matters can be eliminated. After that, the regeneration controlling means measures the quantity of the trapped particulate matters based on pressure loss generated in the particulate filter.

In order to precisely calculate the quantity of the trapped particulate matters, the particulate filter is maintained at the predetermined temperature or above and the SOF included in the particulate matters is eliminated. Thus, the composition of the particulate matters depositing on the particulate filter is changed so that the particulate matters consist of a soot fraction alone. Then, the quantity of the trapped particulate matters is calculated based on a pressure difference between an upstream and a downstream of the particulate filter and the like. Thus, the quantity of the trapped particulate matters is calculated precisely independently of the composition of the particulate matters or a state of the SOF. Therefore, excessive increase in the temperature of the particulate filter during the regeneration and an increase in fuel consumption are prevented. Thus, timing of the regeneration of the particulate filter is set suitably, and the particulate filter is regenerated safely.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT (First Embodiment)

Figure 1:
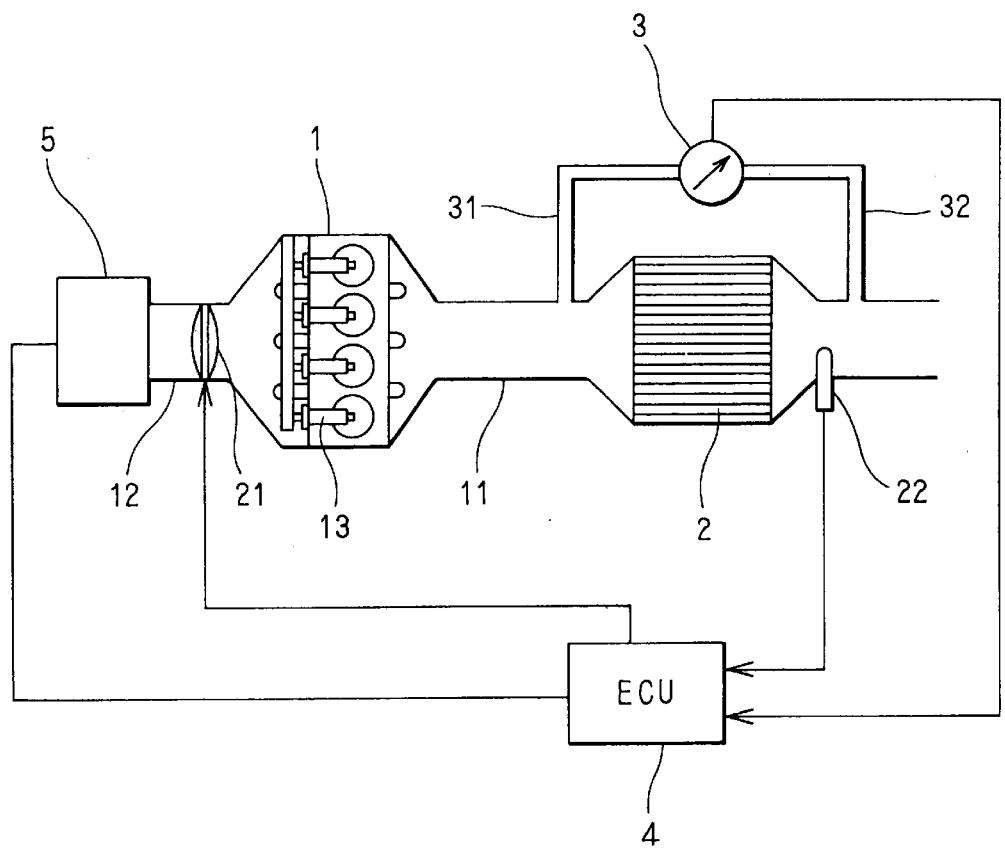
FIG. 1 is a diagram showing an exhaust gas purification system of an internal combustion engine according to a first embodiment of the present invention.

Referring to FIG. 1, an exhaust gas purification system of a diesel engine 1 is illustrated. A diesel particulate filter (DPF) 2 is disposed in an exhaust pipe 11 of the engine 1. The DPF 2 has a publicly known structure. The DPF 2 is made of heat-resistant ceramics such as cordierite and is formed in the shape of a honeycomb. The honeycomb has a matrix of porous filter walls forming a multiplicity of cells extending from one end to another end of the honeycomb. An inlet side end or an outlet side end of each cell is blocked alternately. The exhaust gas discharged from the engine 1 enters the cells whose inlet side ends are open. When the exhaust gas passes through the porous filter wall, particulate matters (PM) are trapped.

A pressure difference measuring device 3 such as a plurality of pressure sensors is disposed in order to measure a quantity of the particulate matters trapped by the DPF 2 (PM trapped quantity). Pressure in the exhaust pipe 11 in the upstream of the DPF 2 is introduced to the pressure difference measuring device 3 through a pressure introduction pipe 31. On the other hand, pressure in the exhaust pipe 11 in the downstream of the DPF 2 is introduced to the pressure difference measuring device 3 through a pressure introduction pipe 32. Thus, the pressure difference measuring device 3 measures the pressure difference between the upstream and the downstream of the DPF 2. DPF temperature measuring device 22 such as a temperature sensor is disposed in the downstream of the DPF 2 for measuring the temperature of the DPF 2. Intake airflow rate measuring device 5 such as a flow meter is disposed in an intake pipe 12 of the engine 1 for measuring an intake airflow rate. Signals from the above measuring devices are inputted to an engine control unit (ECU) 4. The ECU 4 calculates the PM trapped quantity based on an exhaust gas flow rate and the pressure difference between the upstream and the downstream of the DPF 2 and controls regeneration of the DPF 2. The exhaust gas flow rate is calculated from the measured values of the temperature of the DPF 2 and the intake airflow rate.

When the DPF 2 is regenerated, the exhaust gas is heated by decreasing an opening degree of an intake air restrictor 21 disposed in the intake pipe 12 or by delaying injection timing performed by injectors 13, or by performing a post injection. The heated exhaust gas is introduced into the DPF 2 to heat the DPF 2 to the temperature at which the trapped particulate matters can be burned. Thus, the DPF 2 is regenerated. The decreasing of the opening degree of the intake air restrictor 21 may be combined with the injection control. Thus, the exhaust gas can be heated to the temperature high enough to burn the trapped particulate matters. The ECU 4 controls the drive of the intake air restrictor 21 and injectors 13, which are also used as means for heating the DPF 2. Alternatively, as means for heating and regenerating the DPF 2, any kinds of publicly known heaters such as an electric heater, in which metal foil is spirally layered between a central electrode and an outer peripheral electrode, or a diesel oil burner can also be employed. The DPF temperature measuring device 22 may be disposed in the upstream and the downstream of the DPF 2 to measure the temperature of the DPF 2 from the both positions.

Figure 2A:
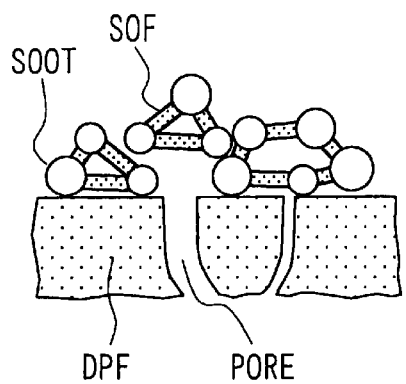
FIG. 2A is a schematic diagram showing a depositing state of particulate matters to a diesel particulate filter (DPF) at the time when the temperature in a cylinder is high.
Figure 2B:
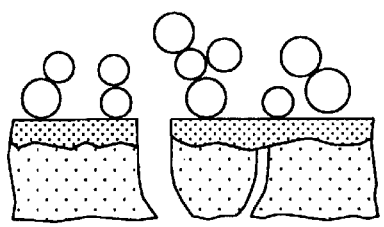
FIG. 2B is a schematic diagram showing a depositing state of the particulate matters to the DPF at the time when the temperature in the cylinder is low.

The state of the particulate matters trapped in the DPF 2 significantly varies, depending on a combusting state in the cylinder. FIG. 2A is a diagram showing a case in which the temperature in the cylinder is high and a soluble organic fraction (SOF) included in the particulate matters is discharged in a gaseous state. The particulate matters deposit on the surface of the DPF 2 while the SOF adheres to the soot particulates between the soot particulates. FIG. 2B is a diagram showing a case in which the temperature in the cylinder is low and the SOF is discharged in a liquid state. The SOF exists independently from the soot particles and soaks into the DPF 2 as shown in FIG. 2B. In the case shown by the diagram in FIG. 2A, the particulate matters deposits while covering the pores of the DPF 2. Therefore, the pressure loss generated in the DPF 2 increases. On the other hand, in the case shown by the diagram in FIG. 2B, the pores are blocked to a relatively low degree. Therefore, the pressure loss is increased to a relatively low degree.

Figure 2C:
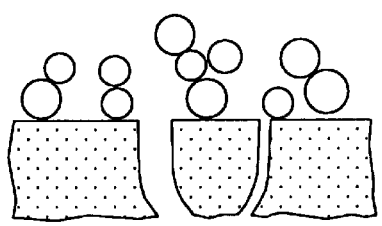
FIG. 2C is a schematic diagram showing a state after a soluble organic fraction is eliminated.
Figure 2D:
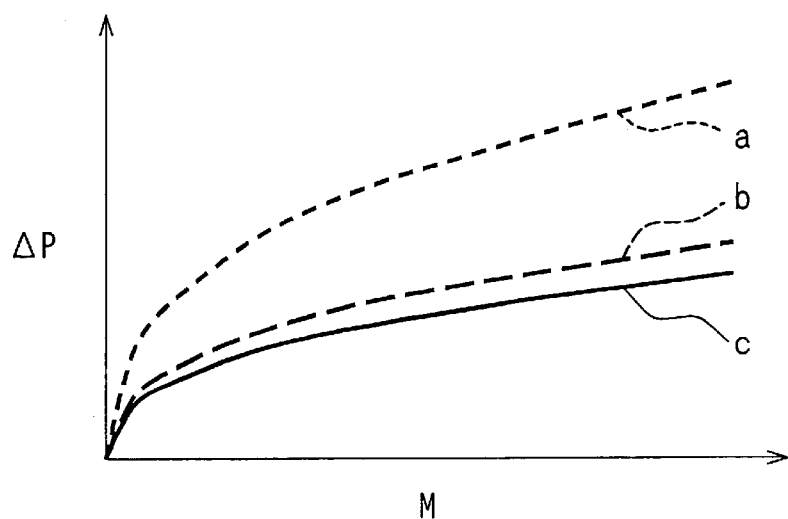
FIG. 2D is a graph showing a relation between a quantity of the trapped particulate matters and a pressure difference between an upstream and a downstream of the DPF.

A graph in FIG. 2D shows a change of a relation between the PM trapped quantity M and the pressure difference ΔP between the upstream and the downstream of the DPF 2. A dotted line "a" in FIG. 2D corresponds to the state of the SOF shown in FIG. 2A. A broken line "b" in FIG. 2D corresponds to the state of the SOF shown in FIG. 2B. A solid line "c" in FIG. 2D corresponds to a state shown in FIG. 2C, in which the SOF is eliminated and only the soot fraction remains. As shown in FIG. 2D, depending on the state of the SOF, the pressure difference ΔP varies even if the PM trapped quantity is the same. The variation in the pressure difference ΔP makes it difficult to precisely calculate the PM trapped quantity M based on the pressure difference ΔP.

Therefore, in the embodiment, the temperature of the DPF 2 is increased to eliminate the SOF by gasification or oxidization before calculating the PM trapped quantity. By measuring the pressure difference after eliminating the SOF, the PM trapped quantity is calculated precisely. It is because the relation between the PM trapped quantity and the pressure difference in the state shown in FIG. 2C is already known as shown by the solid line "c" in FIG. 2D.

Figure 3:
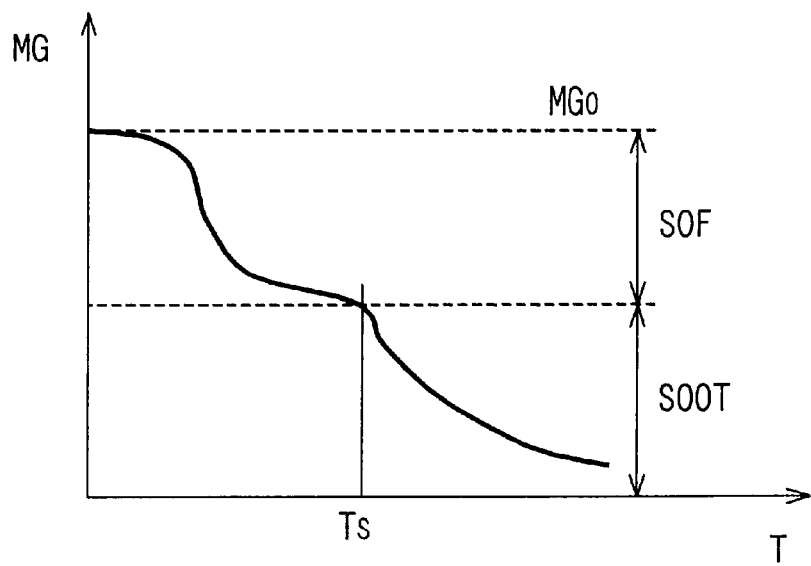
FIG. 3 is a graph showing a relation between the temperature of the DPF and the quantity of the particulate matters trapped in the DPF.
Figure 4:
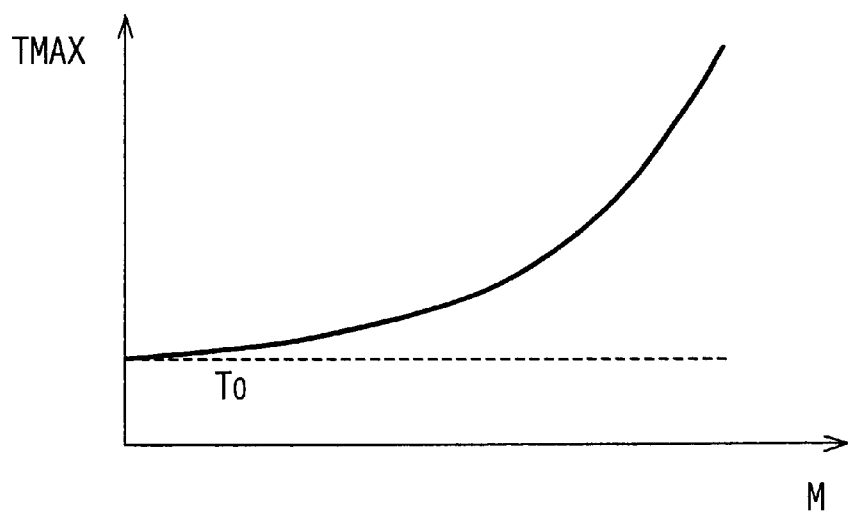
FIG. 4 is a graph showing a relation between the quantity of the trapped particulate matters and a maximum temperature in the DPF generated by rapid burning.

More specifically, the ECU 4 drives the intake air restrictor 21 and the injectors 13 based on the measured result of the DPF temperature measuring device 22 in order to introduce the high-temperature exhaust gas into the DPF 2. Then, the DPF 2 is maintained for a predetermined period at a predetermined temperature at which the SOF included in the particulate matters can be eliminated by the gasification or the oxidization. A graph in FIG. 3 shows a relation between the DPF temperature T and weight of the trapped particulate matters (PM weight MG). As shown in FIG. 3, when the SOF and the soot fraction exist in a certain ratio with respect to the initial PM weight $MG_0$, the ratio of the SOF decreases as the DPF temperature T increases. The ratio of the SOF decreases substantially to zero if the DPF temperature T exceeds a certain temperature Ts. The temperature Ts normally varies in a range generally between 150° C. and 400° C., depending on a kind of the engine 1. Thus, a substantially entire part of the SOF included in the particulate matters is eliminated. Then, the pressure difference ΔP between the upstream and the downstream of the DPF 2 is measured by the pressure difference measuring device 3 and the PM trapped quantity M is calculated. The pressure difference ΔP varies, also depending on a flow rate of the exhaust gas. Therefore, the flow rate (volume flow rate) of the exhaust gas is calculated from the measured values of the temperature of the DPF 2 and the intake airflow rate. Then, the PM trapped quantity M is calculated based on the flow rate of the exhaust gas and the pressure difference ΔP between the upstream and the downstream of the DPF 2.

If the calculated PM trapped quantity M becomes equal to or greater than a predetermined value, the intake air restrictor 21 and the injectors 13 are driven in order to heat the DPF 2 by the high-temperature exhaust gas. The DPF 2 is heated at least to the temperature, at which the particulate matters can be burned. Thus, the DPF 2 is regenerated. The PM trapped quantity M is calculated precisely and the rapid burning in the regeneration is prevented. In addition, an unnecessary increase in the frequency of the regeneration is prevented and an increase in the fuel consumption or power consumption for heating the DPF 2 is prevented.

Figure 5:
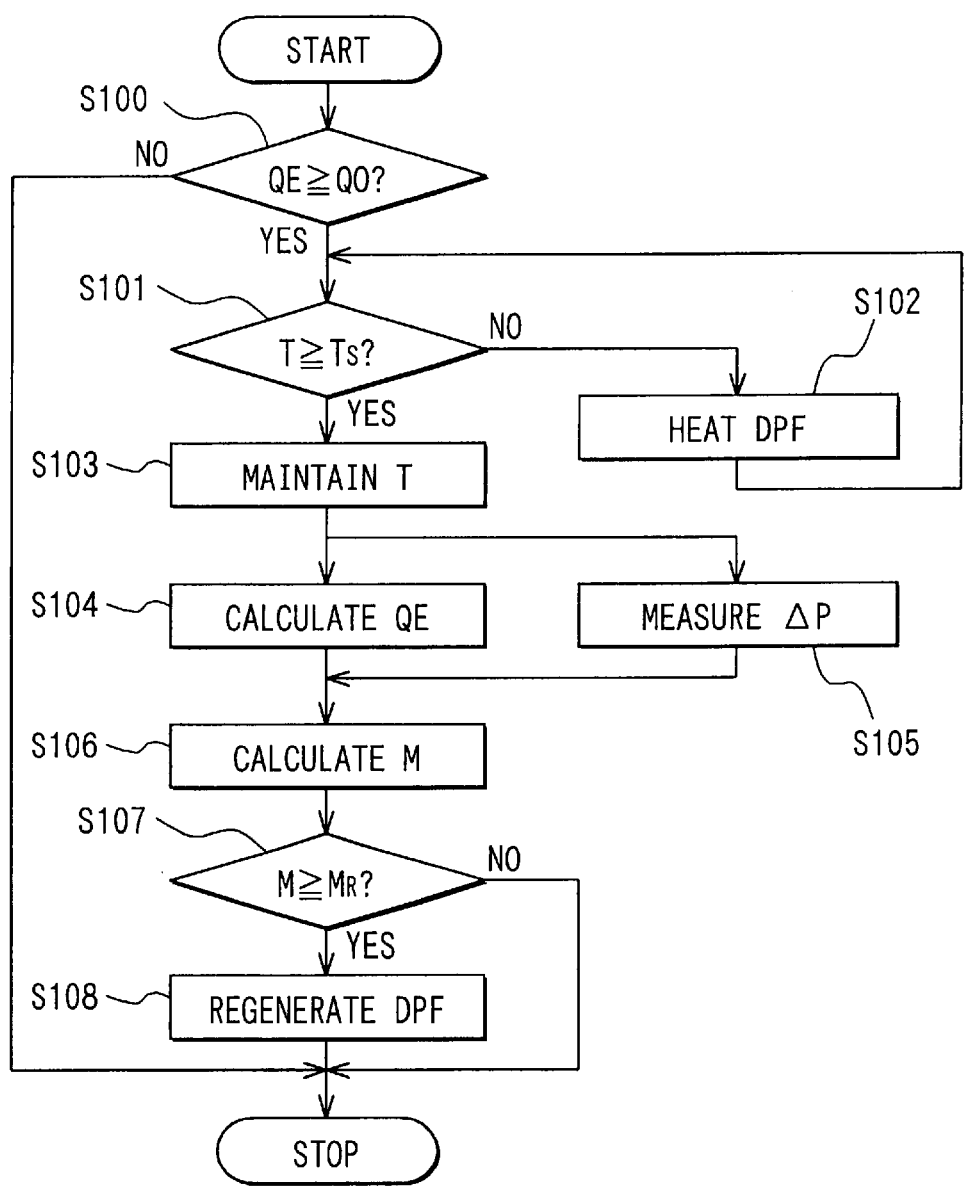
FIG. 5 is a flowchart of a regeneration control processing performed by an engine control unit (ECU) according to the first embodiment.

Next, an example of the above regenerating operation will be explained based on a flowchart shown in FIG. 5. A regeneration control processing shown by the flowchart in FIG. 5 is started when the ECU 4 determines that a predetermined period has passed from previous regeneration of the DPF 2 or when the ECU 4 determines that a vehicle has run a predetermined distance. The regeneration control processing is repeated at a predetermined time interval until the regeneration is performed. In Step S100, it is determined whether the flow rate of the exhaust gas flowing through the exhaust pipe 11 (the exhaust gas flow rate QE, or the volume flow rate QE) is "equal to or larger than" a specified flow rate Q0 or not. Thus, it is determined whether the exhaust gas flow rate QE is in a range where the PM trapped quantity M can be calculated or not. The specified flow rate Q0 is a flow rate above which the pressure difference ΔP can be measured by the pressure difference measuring device 3. The exhaust gas flow rate QE is calculated from the measured values of the temperature of the DPF 2 measured by the DPF temperature measuring device 22 and the intake airflow rate measured by the intake airflow rate measuring device 5. If the result of Step S100 is "NO", the control processing is ended immediately.

If the result of Step S100 is "YES", the processing proceeds to Step S101. In Step S101, the DPF temperature T, the temperature of the DPF 2 measured by the DPF temperature measuring device 22, is inputted. Then, it is determined whether the DPF temperature T is "equal to or higher than" a specified temperature Ts (for instance, 150° C. to 400° C.) or not. The specified temperature Ts is the temperature at which the SOF can be eliminated. If the result of Step S101 is "YES", the processing proceeds to Step S103. If the result of Step S101 is "NO", the DPF 2 is heated by controlling the intake air restrictor 21 and the injectors 13 in Step S102. The operation in Step S102 is repeated until the DPF temperature T becomes equal to or higher than the specified temperature Ts. If the DPF temperature T reaches the specified temperature Ts, the DPF 2 is maintained at the temperature for at least a specified period ts in Step S103. Thus, the SOF included in the particulate matters is eliminated by the gasification or the oxidization. Then, in Step S104, the exhaust gas flow rate QE is calculated from the measured values of the DPF temperature T and the intake air flow rate. Meanwhile, the pressure difference ΔP between the upstream and the downstream of the DPF 2 is measured by the pressure difference measuring device 3 in Step S105. Then, in Step S106, the PM trapped quantity M is calculated based on the exhaust gas flow rate QE and the pressure difference ΔP.

Then, in Step S107, it is determined whether the PM trapped quantity M is "equal to or larger than" a specified quantity $M_R$ or not. If the result of Step S107 is "YES", the processing proceeds to Step S108. In Step S108, the DPF temperature T is increased by controlling the intake air restrictor 21 and the injectors 13, at least to the temperature at which the soot can be burned. Thus, the DPF 2 is regenerated. If the result of Step S107 is "NO", the processing is ended.

As explained above, in the embodiment, independently of the ratio between the SOF and the soot fraction or the state of the SOF, the PM trapped quantity is precisely measured and the regeneration of the DPF 2 is performed at the suitable timing. Therefore, the regeneration frequency does not increase or the fuel consumption or the power consumption does not increase, or the DPF temperature does not increase excessively. Thus, safe and sure regeneration of the DPF can be performed. The DPF temperature at which the SOF can be eliminated (150 to 400° C., for instance) is much lower than the temperature for performing common regeneration of the DPF (generally 650° C., for instance). Therefore, the increase in the fuel consumption or the power consumption is prevented.

(Second Embodiment)

Figure 6:
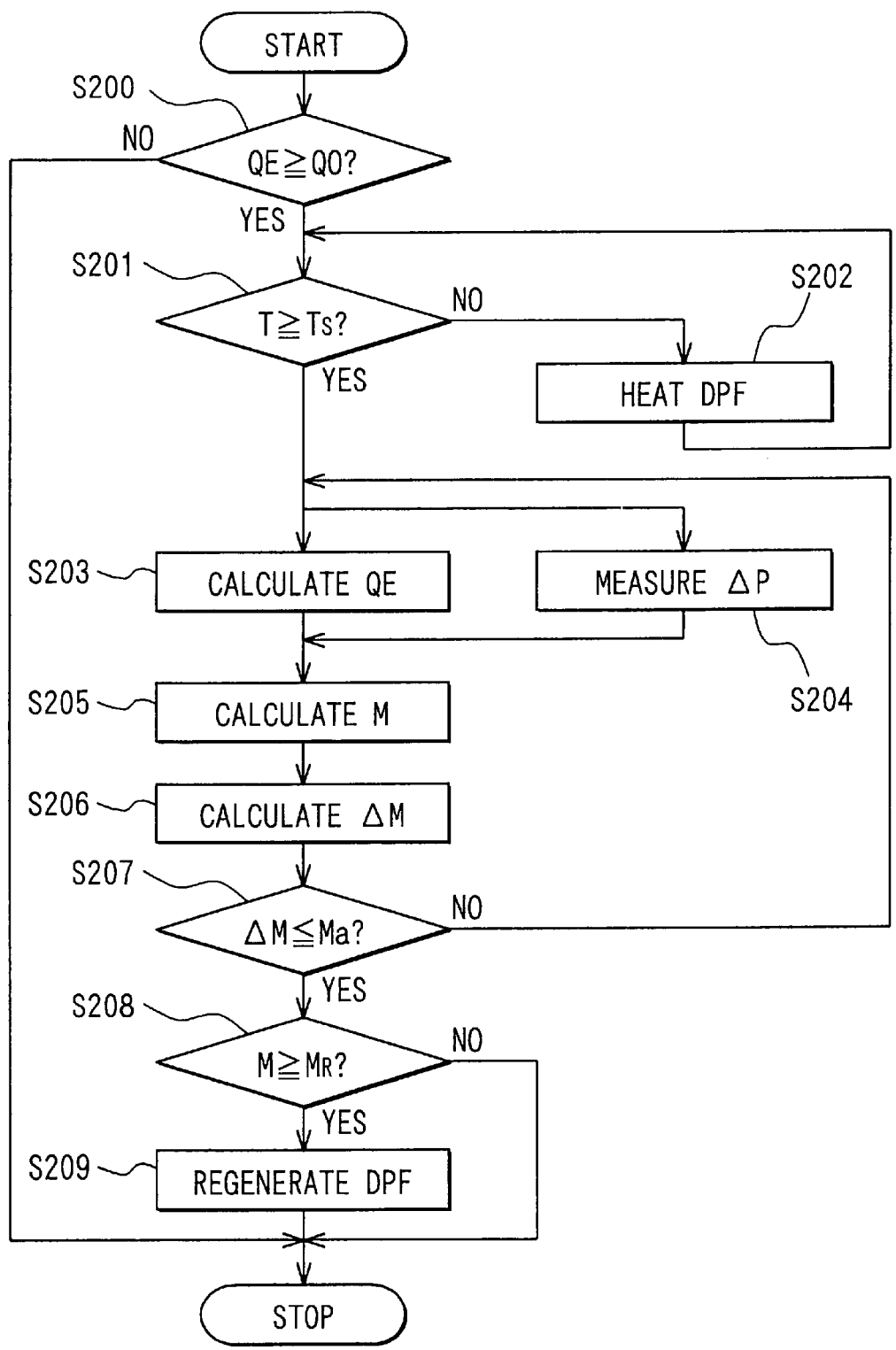
FIG. 6 is a flowchart of a regeneration control processing performed by an engine control unit (ECU) according to a second embodiment of the present invention.

A regeneration control method of the exhaust gas purification system according to the second embodiment will be explained based on FIGS. 6 and 7. In the exhaust gas purification system, after the DPF 2 is heated to the temperature at which the SOF can be eliminated by the gasification or the oxidization, the PM trapped quantity is calculated based on the pressure difference between the upstream and the downstream of the DPF 2 and the exhaust gas flow rate. The exhaust gas flow rate is calculated from the measured values of the DPF temperature and the intake airflow rate. Meanwhile, change of the PM trapped quantity with time is calculated. If the change of the PM trapped quantity with time becomes equal to or less than a predetermined value, the SOF is determined to be substantially eliminated. The PM trapped quantity at that time is measured. When the measured PM trapped quantity becomes equal to or larger than a predetermined quantity, the DPF 2 is regenerated by controlling the intake air restrictor 21 and the injectors 13.

An example of the operation of the ECU 4 according to the second embodiment will be explained based on a flowchart shown in FIG. 6. In Step S200, it is determined whether the flow rate of the exhaust gas passing through the exhaust pipe 11 (the exhaust gas flow rate QE, or the volume flow rate QE) is "equal to or larger than" a specified flow rate Q0 or not. If the result of Step 200 is "NO", the processing is ended immediately. If the result of Step S200 is "YES", the processing proceeds to Step S201, and the DPF temperature "T" measured by the DPF temperature measuring device 22 is inputted. Then it is determined whether the temperature T is "equal to or higher than" a specified temperature Ts (150 to 400° C., for instance) or not. The SOF can be eliminated at the specified temperature Ts. If the result of Step S201 is "YES", the processing proceeds to Step S203.

If the result of Step S201 is "NO", the DPF 2 is heated by controlling the intake air restrictor 21 and the injectors 13 in Step S202. This operation in Step S202 is repeated until the DPF temperature T becomes equal to or higher than the specified temperature Ts. If the DPF temperature T reaches the specified temperature Ts, the exhaust gas flow rate QE is calculated from the measured values of the DPF temperature T and the intake airflow rate in Step S203. Meanwhile, the pressure difference ΔP between the upstream and the downstream of the DPF 2 is measured by the pressure difference measuring device 3 in Step S204. Then, a PM trapped quantity M, a quantity of the trapped particulate matters, is calculated based on the exhaust gas flow rate QE and the pressure difference ΔP in Step S205.

Then, in Step S206, the change of the PM trapped quantity M with time (ΔM) is calculated from the PM trapped quantity M calculated in Step S205 and the PM trapped quantity M calculated in the last time. Then, in Step S207, it is determined whether the change with time ΔM is "equal to or less than" a specified value $M_a$ or not. If the result of Step S207 is "NO", the processing returns to Step S203, and this operation is repeated until the change with time ΔM becomes equal to or less than the specified value $M_a$. If the change with time ΔM becomes equal to or less than the specified value $M_a$, it is determined that the fluctuation of the PM trapped quantity M has converged, or it is determined that the SOF has been eliminated. Then, the processing proceeds to Step S208. In step S208, it is determined whether the PM trapped quantity M is "equal to or larger than" a specified quantity $M_R$ or not. If the result of Step S208 is "YES", the processing proceeds to Step S209. In Step S209, the DPF 2 is heated at least to the temperature at which the particulate matters can be burned by controlling the intake air restrictor 21 and the injectors 13. Thus, the DPF 2 is regenerated. If the result of Step S208 is "NO", the processing is ended.

Figure 7:
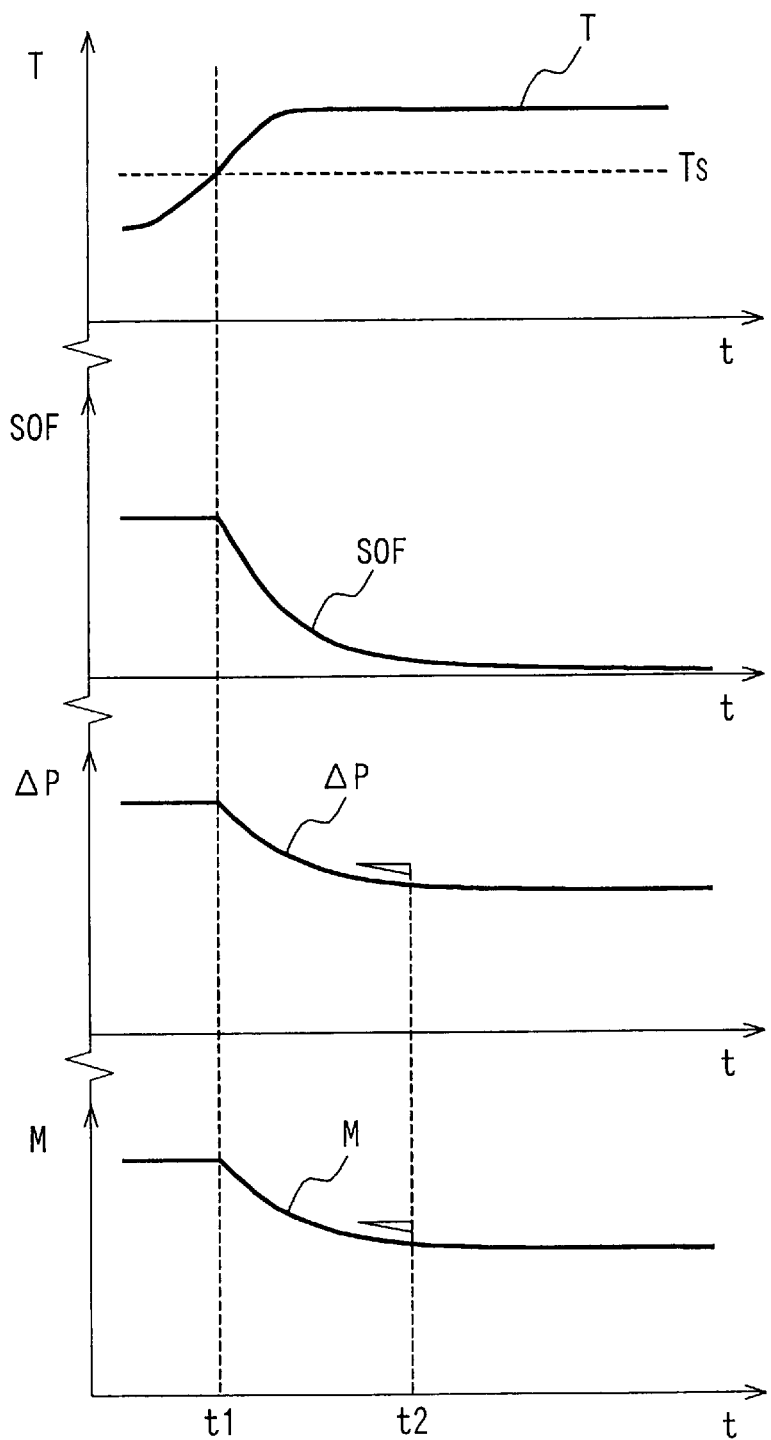
FIG. 7 is a time chart of the regeneration control processing by the ECU according to the second embodiment.

FIG. 7 is a time chart showing change with time of the DPF temperature T, the quantity of the SOF included in the particulate matters, the pressure difference ΔP between the upstream and the downstream of the DPF 2, and the PM trapped quantity M. After a time point t1 in FIG. 7, at which the DPF temperature T becomes equal to the specified temperature Ts, the quantity of the SOF included in the particulate matters decreases as shown by a solid line SOF in FIG. 7. Meanwhile, the pressure difference ΔP between the upstream and the downstream of the DPF 2 decreases as shown by a solid line ΔP in FIG. 7. As the quantity of the SOF included in the particulate matters approaches zero, the change of the pressure difference ΔP with time decreases as shown by a solid line ΔP in FIG. 7. Meanwhile, the change of the PM trapped quantity M with time (ΔM) decreases as shown by a solid line M in FIG. 7. When the change with time ΔM becomes equal to or less than the specified value $M_a$, it is determined that the calculated value of the PM trapped quantity M has converged, at a time point t2 in FIG. 7. Alternatively, it may be determined that the calculated value of the PM trapped quantity M has converged when the change of the pressure difference ΔP with time becomes equal to or less than a specified value $P_a$, at the time point t2. Then, the PM trapped quantity M is calculated.

Thus, the PM trapped quantity M is calculated more precisely by measuring the PM trapped quantity M after the time point t2. As a result, the regeneration of the DPF 2 is performed at suitable timing, safely and surely.

In the embodiments, the pressure difference measuring device 3 is employed as the pressure measuring means. Alternatively, pressure measuring means such as a pressure sensor for measuring the pressure in the upstream of the DPF 2 may be employed. An effect similar to the embodiments is achieved by calculating the PM trapped quantity from the measured pressure in the upstream of the DPF 2.

The present invention should not be limited to the disclosed embodiments, but may be implemented in many other ways without departing from the spirit of the invention.

What is claimed is:

1. An exhaust gas purification system of an internal combustion engine, the exhaust gas purification system comprising:
    a particulate filter disposed in an exhaust pipe of the engine for trapping particulate matters included in exhaust gas; and
    regeneration controlling means for measuring a quantity of the particulate matters trapped by the particulate filter and for regenerating the particulate filter based on the calculated quantity of the trapped particulate matters,
    wherein the regeneration controlling means has temperature controlling means for heating the particulate filter at least to a predetermined temperature at which a soluble organic fraction included in the particulate matters can be eliminated, and trapped quantity measuring means for measuring a quantity of the trapped particulate matters based on a pressure loss generated in the particulate filter after the particulate filter is heated at least to the predetermined temperature.

2. The exhaust gas purification system as in claim 1, wherein;
    the temperature controlling means maintains the particulate filter at the predetermined temperature or above for a predetermined period,
    the trapped quantity measuring means calculates the quantity of the trapped particulate matters based on a pressure loss generated in the particulate filter after the soluble organic fraction is eliminated from the particulate filter, and the regeneration controlling means further includes regeneration executing means for executing regeneration of the particulate filter when the quantity of the trapped particulate matters measured by the trapped quantity measuring means becomes equal to or greater than a predetermined quantity.

3. The exhaust gas purification system as in claim 1, wherein the trapped quantity measuring means measures a change of the pressure loss generated in the particulate filter with time and calculates the quantity of the trapped particulate matters based on the pressure loss at the time when the change of the pressure loss with time becomes equal to or less than a predetermined value.

4. The exhaust gas purification system as in claim 1, wherein;

the trapped quantity measuring means measures a change of the quantity of the trapped particulate matters with time, and the regeneration controlling means executes the regeneration of the particulate filter when the change of the quantity of the trapped particulate matters with time becomes equal to or less than a predetermined value.

5. The exhaust gas purification system as in claim 1, further comprising:

pressure measuring means for measuring a pressure difference between an upstream part and a downstream part of the particulate filter or a pressure in the upstream part of the particulate filter;

temperature measuring means for measuring a temperature of the particulate filter; and intake airflow rate measuring means for measuring a flow rate of intake air, wherein the regeneration controlling means calculates the quantity of the trapped particulate matters based on an exhaust gas flow rate and measurements of the pressure measuring means, the exhaust gas flow rate being calculated from measurements of the temperature measuring means and the intake airflow rate measuring means.

* * * * *